(12) United States Patent
Nyalamadugu et al.

(10) Patent No.: US 9,767,331 B2
(45) Date of Patent: *Sep. 19, 2017

(54) METHODS AND APPARATUS FOR PRESERVING PRIVACY IN AN RFID SYSTEM

(71) Applicant: NEOLOGY, INC., Poway, CA (US)

(72) Inventors: Sheshidher Nyalamadugu, San Diego, CA (US); Jun Liu, San Diego, CA (US); Francisco Martinez de Velasco Cortina, La Jolla, CA (US)

(73) Assignee: NEOLOGY, INC., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,257

(22) Filed: Aug. 4, 2015

(65) Prior Publication Data

US 2015/0339500 A1    Nov. 26, 2015

Related U.S. Application Data

(63) Continuation of application No. 14/229,786, filed on Mar. 28, 2014, now Pat. No. 9,098,790, which is a
(Continued)

(51) Int. Cl.
*G06K 19/073* (2006.01)
*G06K 7/10* (2006.01)
(Continued)

(52) U.S. Cl.
CPC ....... *G06K 7/10277* (2013.01); *G06K 19/073* (2013.01); *G06K 19/0739* (2013.01);
(Continued)

(58) Field of Classification Search
CPC ............. G06K 7/10277; G06K 19/073; G06K 19/07345; G06K 19/0739; H01Q 1/2208; H01Q 9/0414; H01B 21/28
(Continued)

(56) References Cited

U.S. PATENT DOCUMENTS 5,337,063 A     8/1994  Takahira et al.
6,466,131 B1 * 10/2002  Tuttle ................... G01S 13/767
                                                340/10.2
(Continued)

FOREIGN PATENT DOCUMENTS

DE      19742126 A1    3/1999
EP       1087332 A1    3/2001
(Continued)

OTHER PUBLICATIONS

International Search Report and Written Opinion issued in International Patent Application No. PCT/US2009/032840 on May 26, 2009.
(Continued)

*Primary Examiner* — Edwin Holloway, III
(74) *Attorney, Agent, or Firm* — Procopio, Cory, Hargreaves & Savitch LLP; Noel Gillespie; Daniel Robertson

(57) ABSTRACT

A card comprises an antenna configured to generate and receive radio frequency signals, a chip coupled with the antenna, the chip configured to store sensitive information and communicate the information to an authorized reader via the antenna, and a switching mechanism configured to tune and detune the antenna relative to the chip to enable and disable respectively, the chips ability to communicate the sensitive information via the antenna.

10 Claims, 4 Drawing Sheets

Related U.S. Application Data continuation of application No. 13/736,819, filed on Jan. 8, 2013, now Pat. No. 8,710,960, which is a continuation of application No. 12/364,158, filed on Feb. 2, 2009, now Pat. No. 8,350,673.

(60) Provisional application No. 61/025,000, filed on Jan. 31, 2008.

(51) Int. Cl.
*H01Q 1/22* (2006.01)
*H01Q 9/04* (2006.01)
*H01Q 21/28* (2006.01)

(52) U.S. Cl.
CPC ..... *G06K 19/07345* (2013.01); *H01Q 1/2208* (2013.01); *H01Q 9/0414* (2013.01); *H01Q 21/28* (2013.01)

(58) Field of Classification Search
USPC ........................................................ 340/10.1
See application file for complete search history.

(56) References Cited

U.S. PATENT DOCUMENTS

| | | | |
|---|---|---|---|
| 7,782,206 B2 | 8/2010 | Burnett et al. | |
| 8,350,673 B2* | 1/2013 | Nyalamadugu | G06K 19/07345 340/10.1 |
| 8,710,960 B2* | 4/2014 | Nyalamadugu | G06K 19/07345 340/10.1 |
| 9,098,790 B2* | 8/2015 | Nyalamadugu | G06K 19/07345 |
| 2003/0016136 A1 | 1/2003 | Harvey | |
| 2003/0116634 A1 | 6/2003 | Tanaka | |
| 2003/0132301 A1 | 7/2003 | Selker | |
| 2005/0012616 A1 | 1/2005 | Forster et al. | |
| 2005/0237198 A1 | 10/2005 | Waldner et al. | |
| 2006/0054710 A1 | 3/2006 | Forster et al. | |
| 2006/0132313 A1* | 6/2006 | Moskowitz | G06K 19/07345 340/572.7 |
| 2006/0145851 A1* | 7/2006 | Posamentier | G06K 7/0008 340/572.1 |
| 2007/0075837 A1 | 4/2007 | Tuttle et al. | |
| 2007/0200682 A1* | 8/2007 | Colby | G06K 19/025 340/10.51 |
| 2007/0210923 A1* | 9/2007 | Butler | G06K 7/0008 340/572.8 |
| 2007/0290856 A1* | 12/2007 | Martin | G06K 19/0726 340/572.3 |
| 2008/0084310 A1* | 4/2008 | Nikitin | G06K 7/0008 340/572.7 |

FOREIGN PATENT DOCUMENTS

| | | | |
|---|---|---|---|
| EP | 2056234 | A2 | 5/2009 |
| FR | 2757952 | A1 | 7/1998 |

OTHER PUBLICATIONS

European Search Report issued in European Patent Application No. 09708616.9 on May 9, 2011 (9 pages).

* cited by examiner

METHODS AND APPARATUS FOR PRESERVING PRIVACY IN AN RFID SYSTEM

CROSS-REFERENCE TO RELATED APPLICATIONS

This application is a continuation of U.S. application Ser. No. 14/229,786 filed Mar. 28, 2014, now U.S. Pat. No. 9,098,790, which is a continuation of U.S. application Ser. No. 13/736,819 filed Jan. 8, 2013, now U.S. Pat. No. 8,710,960, which is a continuation of U.S. application Ser. No. 12/364,158 filed Feb. 2, 2009, now U.S. Pat. No. 8,350,673, which claims the benefit of U.S. Provisional Application No. 61/025,000 filed Jan. 31, 2008, the disclosures of which are incorporated herein in their entirety by reference.

BACKGROUND

1. Technical Field

The embodiments described herein are related to Radio Frequency Identification (RFID) systems and more particularly to methods and apparatus to prevent unwanted and/or unwarranted access to information stored on an RFID chip.

2. Related Art

RFID is an automatic identification method, relying on storing and remotely retrieving data using devices called RFID tags or transponders. The technology requires some extent of cooperation of an RFID reader and an RFID tag. An RFID tag is an object that can be applied to or incorporated into a variety of products, packaging, identification mechanisms, etc., for the purpose of identification and tracking using radio waves. For example, RFID is used in enterprise supply chain management to improve the efficiency of inventory tracking and management. Some tags can be read from several meters away and beyond the line of sight of the reader.

Most RFID tags contain at least two parts: One is an integrated circuit for storing and processing information, modulating and demodulating a radio-frequency (RF) signal, and other specialized functions. The second is an antenna for receiving and transmitting the signal. As the name implies, RFID tags are often used to store an identifier that can be used to identify the item to which the tag is attached or incorporated. But in today's systems, a RFID tag can contain non-volatile, possibly writable EEPROM for storing additional data as well.

Most RFID systems use a modulation technique known as backscatter to enable the tags to communicate with the reader or interrogator. In a backscatter system, the interrogator transmits a Radio Frequency (RF) carrier signal that is reflected by the RFID tag. In order to communicate data back to the interrogator, the tag alternately reflects the RF carrier signal in a pattern understood by the interrogator. In certain systems, the interrogator can include its own carrier generation circuitry to generate a signal that can be modulated with data to be transmitted to the interrogator.

RFID tags come in one of three types passive, active, and semi passive. Passive RFID tags have no internal power supply. The minute electrical current induced in the antenna by the incoming RF signal from the interrogator provides just enough power for the, e.g., CMOS integrated circuit in the tag to power up and transmit a response. Most passive tags signal by backscattering the carrier wave from the reader. This means that the antenna has to be designed both to collect power from the incoming signal and also to transmit the outbound backscatter signal.

Passive tags have practical read distances ranging from about 10 cm (4 in.) (ISO 14443) up to a few meters (Electronic Product Code (EPC) and ISO 18000-6), depending on the chosen radio frequency and antenna design/size. The lack of an onboard power supply means that the device can be quite small. For example, commercially available products exist that can be embedded in a sticker, or under the skin in the case of low frequency RFID tags.

Unlike passive RFID tags, active RFID tags have their own internal power source, which is used to power the integrated circuits and to broadcast the response signal to the reader. Communications from active tags to readers is typically much more reliable, i.e., fewer errors, than from passive tags.

Active tags, due to their on board power supply, also may transmit at higher power levels than passive tags, allowing them to be more robust in "RF challenged" environments, such as high environments, humidity or with dampening targets (including humans/cattle, which contain mostly water), reflective targets from metal (shipping containers, vehicles), or at longer distances. In turn, active tags are generally bigger, caused by battery volume, and more expensive to manufacture, caused by battery price.

Many active tags today have operational ranges of hundreds of meters, and a battery life of up to 10 years. Active tags can include larger memories than passive tags, and may include the ability to store additional information received from the reader, although this is also possible with passive tags.

Semi-passive tags are similar to active tags in that they have their own power source, but the battery only powers the microchip and does not power the broadcasting of a signal. The response is usually powered by means of backscattering the RF energy from the reader, where energy is reflected back to the reader as with passive tags. An additional application for the battery is to power data storage.

The battery-assisted reception circuitry of semi-passive tags leads to greater sensitivity than passive tags, typically 100 times more. The enhanced sensitivity can be leveraged as increased range (by one magnitude) and/or as enhanced read reliability (by reducing bit error rate at least one magnitude).

The enhanced sensitivity of semi-passive tags place higher demands on the interrogator concerning separation in more dense population of tags. Because an already weak signal is backscattered to the reader from a larger number of tags and from longer distances, the separation requires more sophisticated anti-collision concepts, better signal processing and some more intelligent assessment of which tag might be where.

FIG. 1 is a diagram illustrating an exemplary RFID system 100. In system 100, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency magnetic or electromagnetic field emitted by antenna 106, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator 102 facilitates the reading or writing of data to RFID tags, e.g. RFID tag 110 that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

Today, RFID tags are being incorporated into security documents and identification devices such as passports and travel cards. Most of the RFID protocols in use today do not require a password or other authentication/verification scheme to read information from an RFID tag. Since some of these tags can be read at more than 20 ft, any reader operating at the same frequency and using the same protocol as the tag can read the tag's information. Moreover, there are no methods presently to detect an unauthorized reading of the tag, so the user would have no idea their information has been read. This is major concern for privacy of the individual or the object which is being tagged.

In some applications, for example, border crossing, it is required to allow a user to conveniently turn on or off the RFID tag. The current solution is to use a RF shielding cover. When a user needs to use his RFID card, with an embedded tag, he will pull it out the RF shielding cover. But this method depends on the user not forgetting to put the card back in the shield, and that the user does not lose the shield. Moreover, the user may not be aware of the need for the shield or understand how it works and what it does.

SUMMARY

A card comprises an antenna configured to generate and receive radio frequency signals, a chip coupled with the antenna, the chip configured to store sensitive information and communicate the information to an authorized reader via the antenna, and a switching mechanism configured to tune and detune the antenna relative to the chip to enable and disable respectively, the chips ability to communicate the sensitive information via the antenna.

A document comprises an antenna configured to generate and receive radio frequency signals, a chip coupled with the antenna, the chip configured to store sensitive information and communicate the information to an authorized reader via the antenna, and a switching mechanism configured to tune and detune the antenna relative to the chip to enable and disable respectively, the chips ability to communicate the sensitive information via the antenna.

A method for protecting the privacy of information stored on an RFID tag comprising an antenna and a chip when communicating the information, the method comprising controlling a switching mechanism so as to tune the antenna relative to the chip, communicating the information to a reader when the antenna is tuned, and controlling the switching mechanism so as to detune the antenna relative to chip after the information is communicated to the reader.

A method for tuning an antenna relative to a chip in an RFID tag, the antenna comprising a plurality of portions wherein not all of the portions are in complete electrical communication, the chip comprising a impedance match circuit, the method comprising configuring a switching mechanism such that all portions of the antenna are in complete electrical communication when the switching mechanism is activated and not in complete electrical communication when the switching mechanism is deactivated, activating a switching mechanism so as to place all portions of the antenna in complete electrical communication, and configuring the impedance matching circuit so as to tune the antenna relative to the chip when the switching mechanism is activated such that there is a good impedance match between the chip and the antenna when the switching mechanism is activated.

The RFID tag or circuit may be passive or semi-passive. These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Most of the RFID chips are designed for supply chain applications like pallet tracking etc. For these applications privacy issues like cloning and skimming etc. are not an issue. But, when these RFID chips are used to make RFID tags that are then used in security applications like RFID Identification cards, passports, visas, etc., privacy becomes big concern. Unfortunately, the RFID tags themselves do not incorporate any privacy features to prevent unwarranted access to the information stored on the tag. Even passive RFID tags, when used with suitable equipment, are able to read up to 20-30 feet. With such high potential read ranges, there is always a chance of unauthorized access to the information stored in the RFID chip without such access being noticed by the user.

In the embodiments described below, a switch is included between the antenna and the RFID chip. The switch is configured to tune and detune the antenna in order to enable and disable the chips communication capability. The switch can be activated or deactivated by the user in order to maintain the privacy of the information stored on the tag.

In order to achieve good performance for a passive tag, there should be good impedance match between the antenna and the chip. Accordingly, various techniques have been developed for matching the antenna impedance to that of the chip; however, in the embodiments below, the matching must now take into account the position of the switch as well as other factors as discussed. By taking into account all of these factors, an RFID tag can be designed for use in a variety of products, devices, etc., for which privacy is a concern.

The switch can be implemented with a button as a control, or with any other control mechanism that can enable the switch to be opened and closed, thereby tuning and detuning the antenna. Thus, a user can conveniently control the RFID tag or card to preserve its privacy when needed. For example, the switch can be configured such that it is closed when the tag or card is used. When the user needs to present the tag or card to an authority, the user can press a button to close the switch so that the tag or card can be read by a legitimate reader. After use, the user can press the button again to open the switch such that it cannot be read. In this way, the privacy of the user can be protected.

Figure 2:
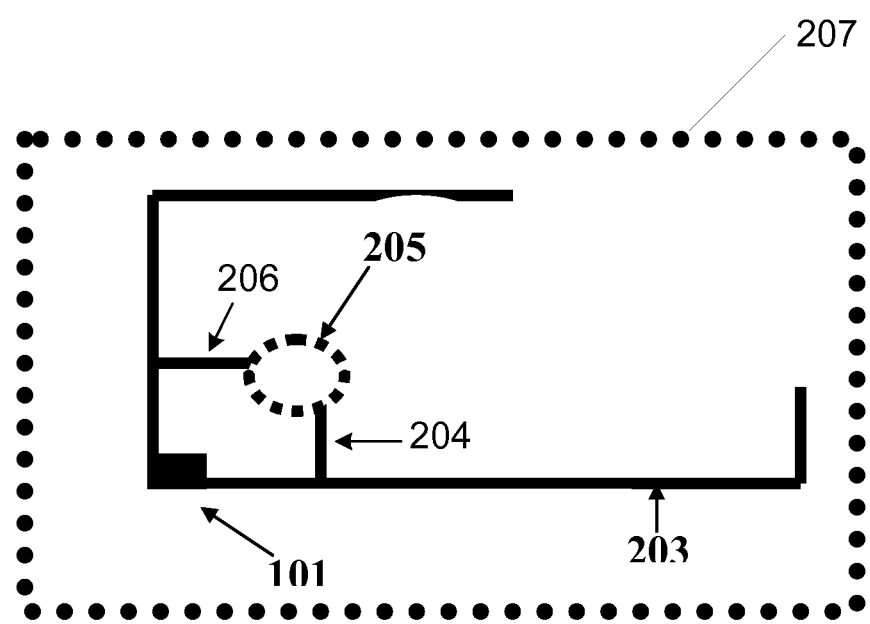
FIG. 2 is a diagram illustrating an example card including an RFID circuit in accordance with one embodiment.
Figure 3:
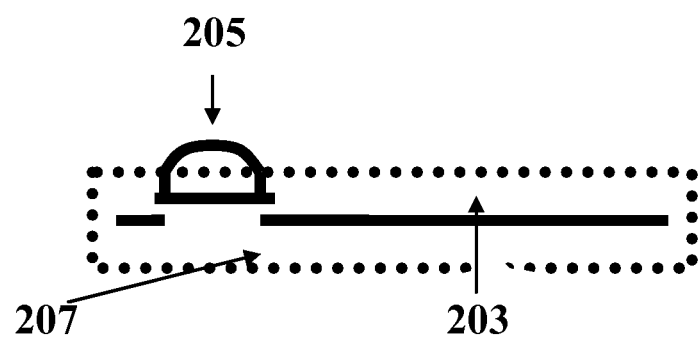
FIGS. 3 and 4 are diagrams illustrating side views of the card of FIG. 2.
Figure 4:
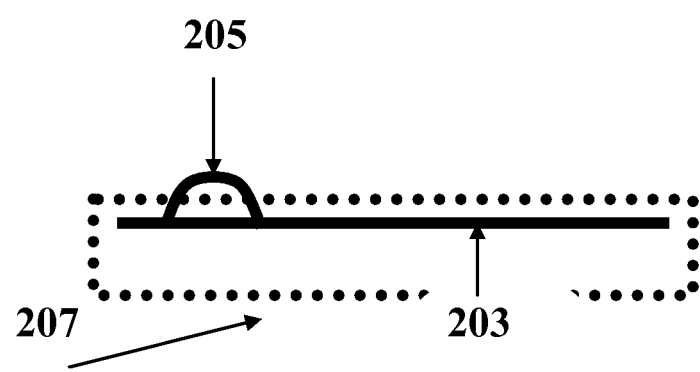

Such an example embodiment is illustrated in FIGS. 2-4. FIG. 2 is a top view of an identification card 207 that includes an RFID circuit comprising chip 101 and antenna 203. As can be seen, antenna 203 also comprises legs 204 and 206. A button 205 is also included as is connected with, or comprises a switch mechanism configured to connect legs 204 and 206 when the button is in the closed position, and to disconnect them when the button is in the open position.

FIG. 3 is a diagram illustrating card 207 with button in the open 205 position, and FIG. 4 is a diagram illustrating card 207 when button 205 is in the closed position.

Antenna 203 is tuned with button 205, or more specifically the switching mechanism in the closed position such that legs 204 and 206 are connected, or more specifically in electrical communication and acting as part of antenna 203. Thus, the impedance matching between chip 101 and antenna 203 must be designed to take into account the impedance of antenna 203 when the switching mechanism and legs 204 and 206 form part of antenna 203.

As a result of the tuning of the impedance match, when the switch mechanism is open, there will be an impedance mismatch between chip 101 and antenna 203. The amount of impedance mismatch can be made to vary as required by a specific implementation to ensure that there is no unauthorized access to chip 101. For example, in one embodiment, the impedance of antenna 203 as seen by chip 101 and with the switch mechanism closed can be approximately 20+j110 ohms. But when the switch mechanism is open, then the impedance of antenna 203 as seen by chip 101 can be approximately 25−j105. In this example, the reactance part of the impedance is changing with the position of the switching mechanism. In other embodiments, the real part of the impedance can be made to change instead or in addition to the reactance part of the impedance.

Other effects can also be taken into account to ensure a proper impedance match. For example, in certain implementations, the human body can be in close proximity to antenna 203 when the card 207 is used, i.e., when the switching mechanism is closed. As a result, human body effects can be considered during the matching or mismatching of antenna 203.

In other embodiments, the antenna can be tuned with the switch in an open position. Further, the antenna configuration, switch position, etc., illustrated in FIGS. 2-4 is by way of example only and is not intended to limit the embodiments described herein. Still further, while card 207 has been described as an identification card, the methods and apparatus described herein can also be implemented in other types of cards, documents, devices, etc. For example, the embodiments described herein can also be included in a visa, passport, sensitive document, credit card, etc.

The mechanism for activating the switching mechanism can also take several forms. For example, the activation mechanism can be a positional switch, a slide mechanism, etc. The activation mechanism can be any type of mechanism that allows the antenna to be tuned and detuned as needed. Further, the switching mechanism and activation mechanism can be one in the same, i.e., the connection between legs 204 and 206, or between segments of the antenna, can be a path through the activation mechanism. Alternatively, the activation mechanism can cause a connection, or conductive path to be put in position such that, e.g., legs 204 and 206 are conductively connected.

Figure 1:
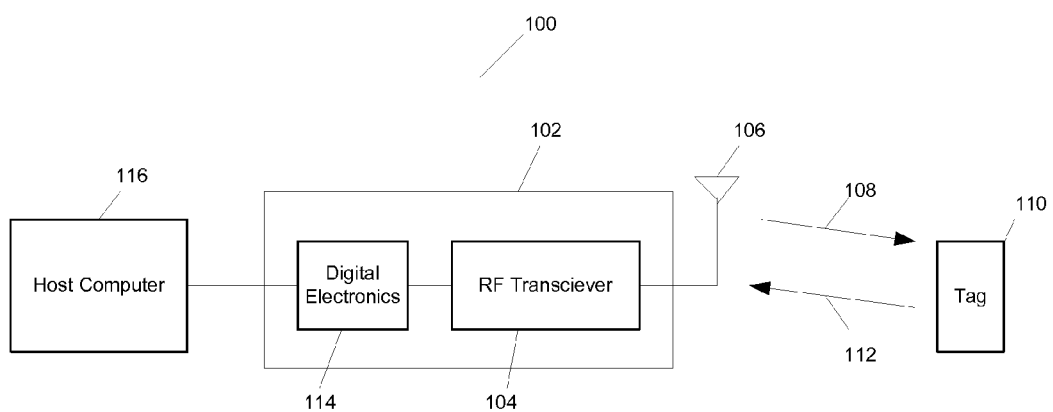
FIG. 1 is a diagram illustrating an exemplary RFID system.

In the embodiment of FIGS. 1-3, antenna 203 was illustrated as comprising a main portion and two legs 204 and 206 that are not in electrical communication when the switching mechanism is open. In other embodiments, more or less legs, as well as other configurations can be used. For example, a single leg that is not in electrical communication on at least one end with the main portion, i.e., not in complete electrical communication.

As noted above, elements outside of card 207 can influence the tuning of antenna 203. One of skill in the art will also understand that card, or device 207 can also effect the tuning of antenna 203. For example, if card 207 is a credit card or travel card, then card 207 will comprise some form of plastic substrate which may or may not effect the antenna tuning. Similarly, if device 207 is a travel document such as a visa or passport, then the device can comprise one or more layers or pages of paper, which may or may not be stored inside of a cover, such as a plastic cover. The paper, cover, etc., may or may not effect the antenna tuning. Certainly, if device 207 comprises or is affixed to, e.g., metal or glass, then these elements will effect the tuning. All of these factors should be taken into consideration when tuning antenna 203.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An RFID device for storing and communicating information to an authorized reader, the RFID device comprising:
   a cover;
   a substrate within the cover;
   an antenna configured to transmit and receive radio frequency signals, wherein the antenna comprises a main portion, a first portion, and a second portion;
   a chip on the substrate coupled with the antenna, the chip including an impedance matching circuit, the chip configured to store information and communicate the information to the authorized reader via the antenna; and
   a switching mechanism configured to connect and disconnect the first portion and a second portion of the antenna to tune and detune the antenna relative to the chip to enable and disable, respectively, the chip's ability to communicate the information via the antenna, wherein the first portion is electrically decoupled from the second portion when the switching mechanism is in a first position, wherein the switching mechanism causes the first portion and the second portion to be electrically coupled when the switching mechanism is in a second position, and wherein the switching mechanism becomes a part of the antenna and substantially tunes the antenna with respect to the chip in the second position, wherein the impedance matching circuit is configured to ensure that when the switching mechanism is in the second position, there is a good impedance match between the chip and the antenna, the impedance matching circuit further configured to account for the effects of the substrate, the switching mechanism, and a surface to which the device is attached when the antenna is tuned and detuned via the switching mechanism.

2. The RFID device of claim 1, wherein the switching mechanism is a button.

3. The RFID device of claim 1, wherein the antenna is tuned with respect to the chip when the first and second portions are electrically coupled, and detuned when they are not.

4. The RFID device of claim 1, wherein the antenna is detuned with respect to the chip when the first and second portions are electrically coupled, and tuned when they are not.

5. The RFID device of claim 1, wherein the substrate is part of a credit card.

6. The RFID device of claim 1, wherein the substrate is part of an identification card.

7. The RFID device of claim 1, wherein the substrate is part of a travel card.

8. The RFID device of claim 1, wherein the substrate is part of a driver's license.

9. The RFID device of claim 1, wherein the RFID device further comprises an activation mechanism configured to control the switching mechanism, wherein the activation mechanism is user-operable.

10. The RFID device of claim 1, wherein the matching circuit is further configured to account for the effects of the cover when the antenna is tuned and detached.

\* \* \* \* \*